(12) United States Patent
Yosui

(10) Patent No.: US 9,583,834 B2
(45) Date of Patent: Feb. 28, 2017

(54) ANTENNA MODULE AND RADIO COMMUNICATION DEVICE

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 337 days.

(21) Appl. No.: 14/200,128

(22) Filed: Mar. 7, 2014

(65) Prior Publication Data

US 2014/0184462 A1 Jul. 3, 2014

Related U.S. Application Data

(63) Continuation of application No. PCT/JP2013/065322, filed on Jun. 3, 2013.

(30) Foreign Application Priority Data

Jun. 4, 2012 (JP) .................... 2012-126653

(51) Int. Cl.
*H01Q 7/06* (2006.01)
*H01Q 1/38* (2006.01)
*G06K 19/077* (2006.01)

(52) U.S. Cl.
CPC .......... *H01Q 7/06* (2013.01); *G06K 19/07775* (2013.01); *G06K 19/07794* (2013.01); *H01Q 1/38* (2013.01)

(58) Field of Classification Search
None
See application file for complete search history.

(56) References Cited

U.S. PATENT DOCUMENTS

| 2005/0162331 A1 | 7/2005 | Endo et al. |
| 2010/0164823 A1 | 7/2010 | Kubo et al. |
| 2011/0124299 A1 | 5/2011 | Koujima et al. |

FOREIGN PATENT DOCUMENTS

| EP | 2 573 871 A1 | 3/2013 |
| EP | 2573871 A1 * | 3/2013 |

(Continued)

OTHER PUBLICATIONS

Official Communication issued in International Patent Application No. PCT/JP2013/065322, mailed on Aug. 20, 2013.

(Continued)

*Primary Examiner* — Robert Karacsony
(74) *Attorney, Agent, or Firm* — Keating & Bennett, LLP

(57) ABSTRACT

An antenna module includes a first coil conductor, a second coil conductor and a magnetic layer. The first coil conductor and the second coil conductor are arranged with a magnetic layer interposed therebetween so that a coil aperture of the first coil conductor and a coil aperture of the second coil conductor are opposed to each other in alignment. An inner end portion of the first coil conductor and an inner end portion of the second coil conductor are electrically connected. The first coil conductor and the second coil conductor are connected to each other so that directions of magnetic fluxes generated in coil-wound axis directions of the first coil conductor and the second conductor are mutually opposite to each other. A magnetic flux φ entering a metal body in a perpendicular direction thereto flows in a lateral direction of the magnetic layer.

18 Claims, 26 Drawing Sheets

(56) References Cited

FOREIGN PATENT DOCUMENTS

| | | |
|---|---|---|
| JP | 2004-166175 A | 6/2004 |
| JP | 2004-213582 A | 7/2004 |
| JP | 3933191 B1 | 6/2007 |
| JP | 2009-284476 A | 12/2009 |
| JP | 2011-066628 A | 3/2011 |
| WO | 2012/033031 A1 | 3/2012 |

OTHER PUBLICATIONS

Official Communication issued in corresponding Japanese Patent Application No. 2013-552786, mailed on Dec. 24, 2014.

* cited by examiner

ANTENNA MODULE AND RADIO COMMUNICATION DEVICE

BACKGROUND OF THE INVENTION

1. Field of the Invention

The present invention relates to an antenna module and a radio communication device for use in an RFID (Radio Frequency Identification) system or a near field communication (NFC) system.

2. Description of the Related Art

The RFID system is in widespread use as a billing and charge collection system. In the RFID system, a reader and writer and an RFID tag communicate with each other in a non-contact fashion, and communications are performed between these two devices. Each of the reader and writer and the RFID tag includes a RFID chip to process a signal and an antenna to exchange a radio signal. For example, in an HF-band RFID system, a signal is transmitted and received via an induction field between a coil antenna of the reader and writer and a coil antenna of the tag. Japanese Unexamined Patent Application Publication No. 2004-166175, Japanese Patent No. 3933191, and Japanese Unexamined Patent Application Publication No. 2009-284476 disclose antennas for use in such an HF band RFID system.

Like Felica (registered trademark) introduced during recent years, an HF-band RFID system has been introduced in an information communication terminal, such as a portable telephone, and the terminal itself has been used as a reader and writer or an RFID tag. In such a case, a metal body such as a ground electrode of a printed wiring board or a battery pack may be placed in the vicinity of a coil antenna. However, if a metal body is located close to a coil aperture of the coil antenna, an eddy current is generated to cancel a change in a magnetic field of the coil antenna, and it is thus difficult to achieve sufficient communication distance. For this reason, a coil antenna that remains operative even when it is close to the metal body is needed. Such an antenna as disclosed in Japanese Unexamined Patent Application Publication No. 2004-166175 has a structure in which a magnetic body such as one made of ferrite is sandwiched between the coil antenna and an object on which the coil antenna is to be glued. In such a structure, it is still difficult to sufficiently prevent a magnetic field from entering the metal body, depending on an operation frequency band, thickness and magnetic permeability of the magnetic body, and the like. In other words, the magnetic body needs to be thickened in order to sufficiently control the effect of the magnetic body, and as a result, the size of the antenna increases.

Japanese Patent No. 3933191 discloses an antenna including a magnetic core in a rectangular shape, a first coil arranged at one end of the magnetic core, and a second coil arranged at the other end of the magnetic core. In the antenna, the first coil and the second coil are mutually different in coil-wound directions, and magnetic fields entering between the coils are guided in respective coil directions. The antenna can thus be located close to the metal body. In this antenna, however, communication distances in the top surface direction and end portion direction of the magnetic core are long, but it is difficult to achieve a long communication distance in a direction vertical to the axis of the magnetic core. In other words, there is a direction suffering from low gain.

Japanese Unexamined Patent Application Publication No. 2009-284476 discloses as an antenna excellent in multi-directional directivity an antenna including a magnetic core having a radially extending end portion. A coil is wound around the radially extending magnetic core so that a polarity remains the same. Since the antenna has directivity in a direction in which the magnetic core extends, the communication distance in this direction can be increased. However, the antenna of this structure is complex in the shape of the magnetic core, and it is not easy to wind the coil around the magnetic core.

SUMMARY OF THE INVENTION

Preferred embodiments of the present invention provide a radio communication device including an antenna module with a simple structure and wide directivity, and suffering less from eddy current loss in a nearby metal object.

An antenna module according to a preferred embodiment of the present invention includes a coil conductor wound in a coil configuration. The coil conductor includes a first coil conductor and a second coil conductor. The first coil conductor and the second coil conductor are arranged with a magnetic layer interposed therebetween so that a coil aperture of the first coil conductor and a coil aperture of the second coil conductor are opposed to each other in alignment. The first coil conductor and the second coil conductor are connected to each other so that directions of magnetic fluxes generated in coil-wound axis directions of the first coil conductor and the second conductor are mutually opposite to each other.

With this arrangement, the magnetic flux entering the coil aperture of the first coil conductor easily flows through the gap between the first coil conductor and the second coil conductor in a lateral direction (in a plane direction). This arrangement results in an antenna module that has wider directivity and suffers less from an eddy current loss in a nearby metal object.

The first coil conductor and the second coil conductor are preferably connected in series. This arrangement simplifies a connection structure between the first coil conductor and the second coil conductor and allows the antenna module to be connected to an external circuit via a two-electrode signal line.

The antenna module preferably includes a first electrode connected to one end of the first coil conductor and a second electrode connected to one end of the second coil conductor. The first coil conductor and the second coil conductor are connected in series via a capacitance generated between the first electrode and the second electrode. The arrangement eliminates the need for a wiring that directly connects the first coil conductor and the second coil conductor, and the manufacturing process of the antenna module is simplified.

The first coil conductor and the second coil conductor are preferably connected in parallel. This arrangement easily allows the antenna module to have a low-impedance property, and to be connected to an external circuit via a two-electrode signal line.

Each of the first coil conductor and the second coil conductor is preferably a coil conductor provided on a plane. This arrangement facilitates the formation of the first coil conductor and the second coil conductor and allows flat design to be applied to the entire antenna module.

The first coil conductor and the second coil conductor are preferably identical or substantially identical to each other in pattern when viewed in the coil-wound axis direction thereof. The arrangement increases the degree of symmetry between a magnetic field generated in the first coil conductor and a magnetic field generated in the second coil conductor and causes a magnetic flux flowing through the gap between the first coil conductor and the second coil conductor in the literal direction (plane direction) to be in alignment with the plane direction of the coil aperture plane.

The antenna module may include a metal object that is arranged on one of the coil apertures of the second coil conductor opposite the first coil conductor. This arrangement allows the magnetic flux to pass through the coil aperture of the first coil conductor, thus enabling communications. Since the magnetic field flows in a manner such that the magnetic field skirts the metal object on the second coil conductor, an eddy current loss is less likely to occur. For this reason, an increase in the loss is controlled even if the antenna module is mounted on the metal object.

The antenna module may include a booster antenna (coil) that is magnetically coupled via a magnetic flux that flows through a gap between the first coil conductor and the second coil conductor. This arrangement allows the first coil conductor and the second coil conductor opposed to each other with the magnetic layer interposed therebetween to operate as a power supply coil for the booster antenna. The booster antenna and the power supply coil are thus arranged in a non-contact fashion.

The antenna module may include a power supply coil (seed coil) that is magnetically coupled via a magnetic flux that flows through a gap between the first coil conductor and the second coil conductor. This arrangement allows the first coil conductor and the second coil conductor opposed to each other with the magnetic layer interposed therebetween to operate as the booster antenna that is magnetically coupled with the power supply coil (seed coil). The power supply coil and the booster antenna are thus arranged in a non-contact fashion.

The magnetic layer is preferably a multi-layer board including a magnetic material layer. The first coil conductor and the second coil conductor are provided in the magnetic material layer or a non-magnetic material layer of the multi-layer board. With this arrangement, the elements are combined into a flat unitary component, and become easy to mount on a surface of a board, for example.

A radio communication device according to a preferred embodiment of the present invention includes a communication circuit and an antenna module connected to the communication circuit. The antenna module includes a coil conductor wound in a coil configuration. The coil conductor includes a first coil conductor and a second coil conductor. The first coil conductor and the second coil conductor are arranged with a magnetic layer interposed therebetween so that a coil aperture of the first coil conductor and a coil aperture of the second coil conductor are opposed to each other in alignment. The first coil conductor and the second coil conductor are connected to each other so that directions of magnetic fluxes generated in coil-wound axis directions of the first coil conductor and the second conductor are mutually opposite to each other.

According to various preferred embodiments of the present invention, the magnetic flux passes through the gap between the first coil conductor and the second coil conductor, thereby passing in directions around 360°. Wide directivity thus results. Since the magnetic flux entering the coil apertures of the first and second coil conductors from a vertical direction flows through the gap between the first coil conductor and the second coil conductor in a lateral direction (plane direction), an eddy current loss is less likely to occur in the nearby metal object. A low-loss property thus results.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
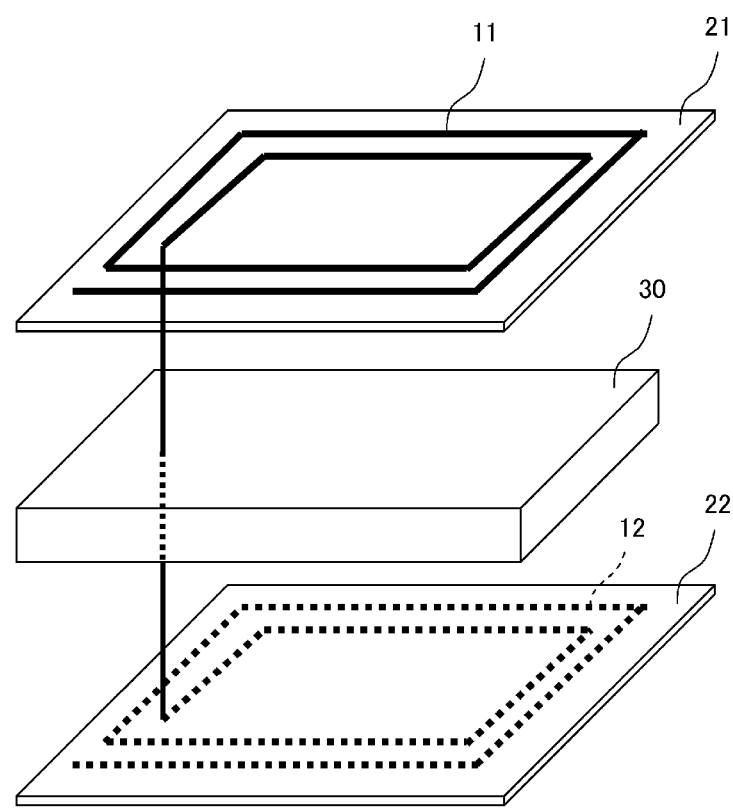
FIG. 1 is an exploded perspective view of an antenna module 101 according to a first preferred embodiment of the present invention.

FIG. 1 is an exploded perspective view of an antenna module 101 according to a first preferred embodiment of the present invention. The antenna module 101 is preferably used in an HF-band communication system and includes a first coil conductor 11, a second coil conductor 12 and a magnetic layer 30. The first coil conductor 11 is provided on the top surface of a base body 21 as a non-magnetic sheet. The second coil conductor 12 is provided on the bottom surface of a base body 22 as a non-magnetic sheet.

More specifically, the first coil conductor 11 and the second coil conductor 12 are formed by patterning, into a coil form, a metal film, such as Cu foil, arranged on the flexible base bodies 21 and 22 made of polyethylene terephthalate or the like. The facing surfaces of the first coil conductor 11 and the second coil conductor 12 are preferably parallel or substantially parallel to each other.

The magnetic layer 30 may be a ferrite sintered body (ferrite ceramic) that is produced by molding and sintering ferrite powder, or a sheet that is produced by molding a complex magnetic body including resin, such as epoxy resin, and magnetic powder, such as ferrite, dispersed in the resin. The magnetic layer 30 preferably is rectangular or substantially rectangular, but may have another shape such as a circular or substantially circular.

The first coil conductor 11 and the second coil conductor 12 are arranged with the magnetic layer 30 interposed therebetween such that coil apertures thereof are opposed to each other in alignment. An inner peripheral end of the first coil conductor 11 is electrically connected to an inner peripheral end of the second coil conductor 12.

Figure 2A:
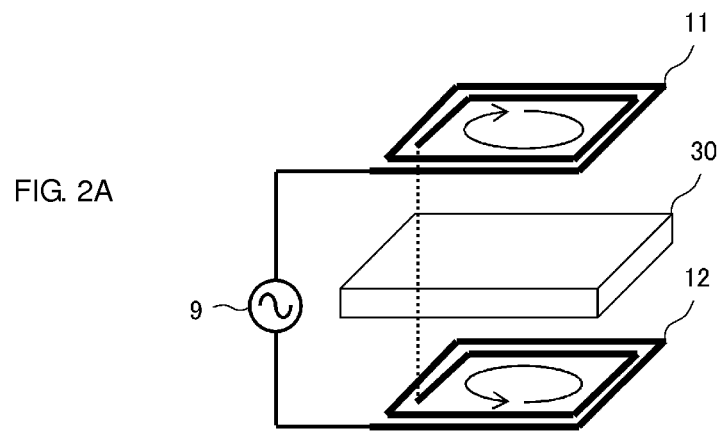
FIG. 2A illustrates a connection arrangement between a first coil conductor 11 and a second coil conductor 12.

FIG. 2A illustrates a connection arrangement between the first coil conductor 11 and the second coil conductor 12. As illustrated in FIG. 2A, the first coil conductor 11 and the second coil conductor 12 are connected to each other so that the directions of magnetic fluxes generated around coil-wound axes of the first coil conductor 11 and the second coil conductor 12 are mutually opposite to each other.

Figure 2B:
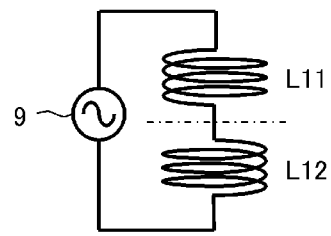
FIG. 2B illustrates an equivalent circuit diagram of the circuit of FIG. 2A.

FIG. 2B illustrates an equivalent circuit diagram of the circuit of FIG. 2A. An inductor L11 corresponds to the first coil conductor 11 and an inductor L12 corresponds to the second coil conductor 12. In other words, in this example, the first coil conductor 11 and the second coil conductor 12, which are connected in series, are connected via a power supply circuit 9.

Figure 3A:
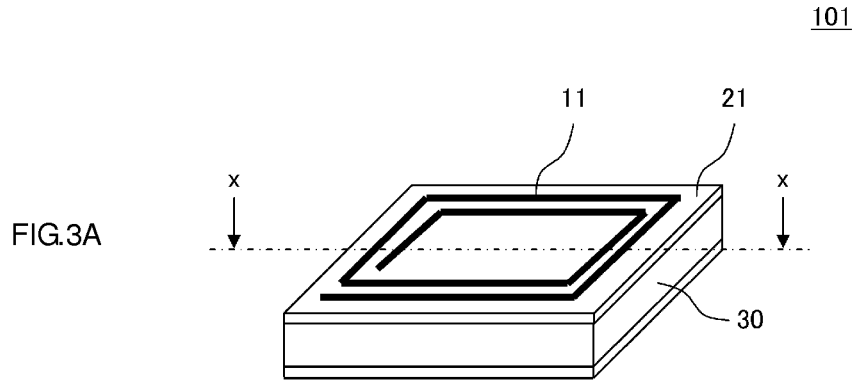
FIG. 3A is a perspective view of the antenna module 101.
Figure 3B:
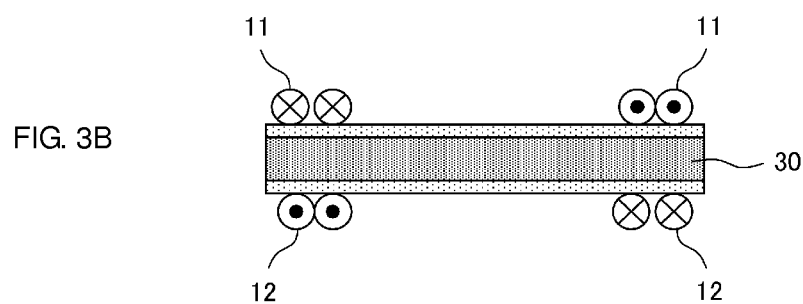
FIG. 3B is a sectional view taken along line x-x in FIG. 3A.

FIG. 3A is a perspective view of the antenna module 101. FIG. 3B is a sectional view of the antenna module 101 taken along line x-x in FIG. 3A. The first coil conductor 11 and the second coil conductor 12 are exaggerated in cross-sectional circular or substantially circular shape to represent the direction of currents. At this timing, the currents flowing through the first coil conductor 11 and the second coil conductor 12 match the directions denoted by arrows in FIG. 2A.

Figure 22A:
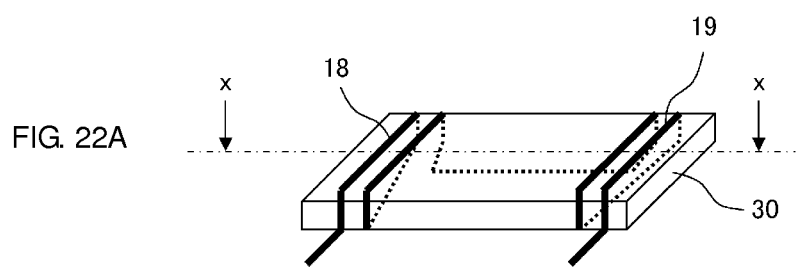
FIG. 22A is a perspective view of an antenna module as a comparative example to the antenna module 101.
Figure 22B:
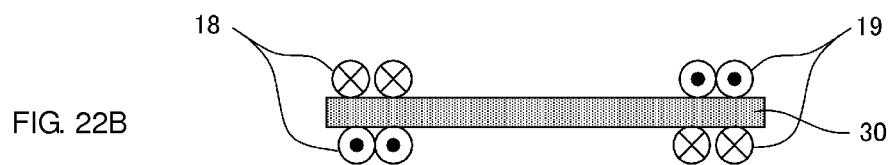
FIG. 22B is a sectional view taken along line x-x from FIG. 22A.

FIG. 22A is a perspective view of an antenna module as an example comparative to the antenna module 101. FIG. 22B is a sectional view taken along line x-x in FIG. 22A (sectional view in a plane in parallel with coil-wound axes of coil conductors 18 and 19). The antenna module of FIG. 22A includes the coil conductors 18 and 19 formed in a rectangular parallelepiped magnetic layer 30. The coil conductors 18 and 19 are wound in mutually opposite directions and are connected in series.

A comparison of FIG. 3B with FIG. 22B clearly indicates that the directions of the currents flowing through the coil conductors 11 and 12 are identical to the directions of the currents flowing through the coil conductors 18 and 19 in cross-section.

Figure 4A:
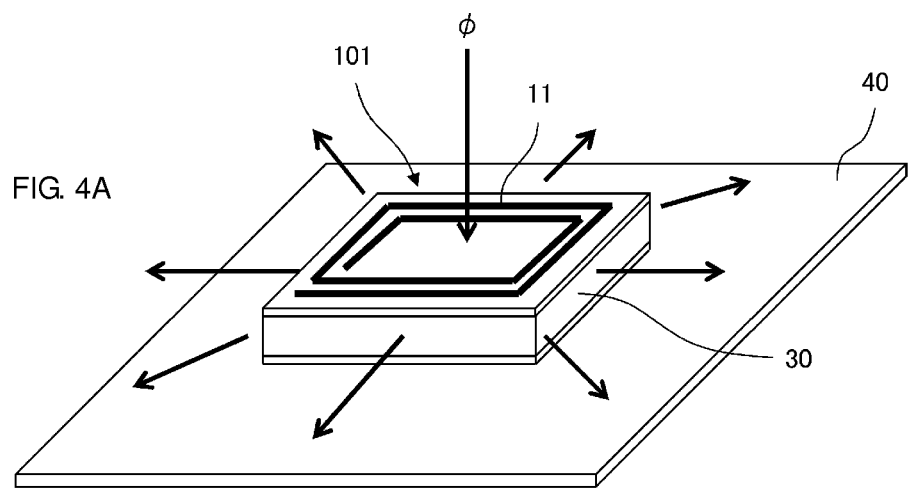
FIG. 4A is a perspective view illustrating a path of a magnetic flux with a metal body 40 arranged close to the antenna module 101.
Figure 4B:
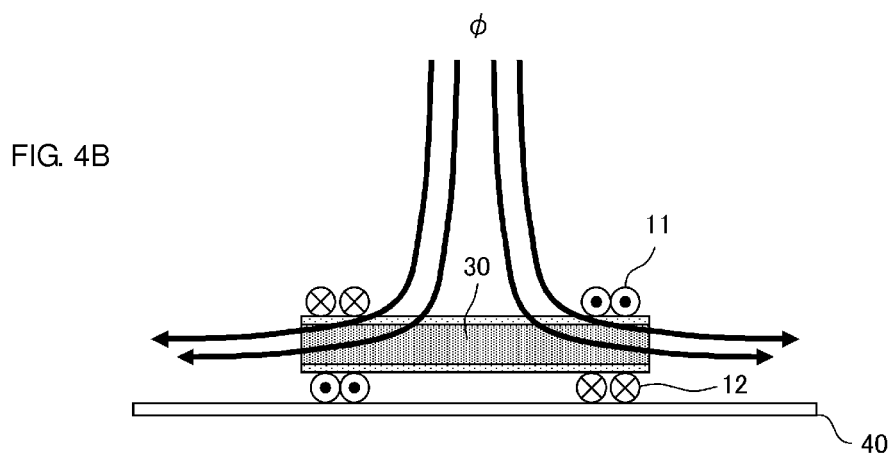
FIG. 4B is a sectional view taken from FIG. 4A.

FIG. 4A is a perspective view illustrating a path of a magnetic flux with a planar metal body 40 arranged close to the antenna module 101. FIG. 4B is a sectional view taken from FIG. 4A. The metal body 40 may be the ground of a printed wiring board arranged in the housing of a communication terminal, or may be a metal body such as a battery pack or a shield case. The metal body 40 may also be part of a metal housing.

Figure 23A:
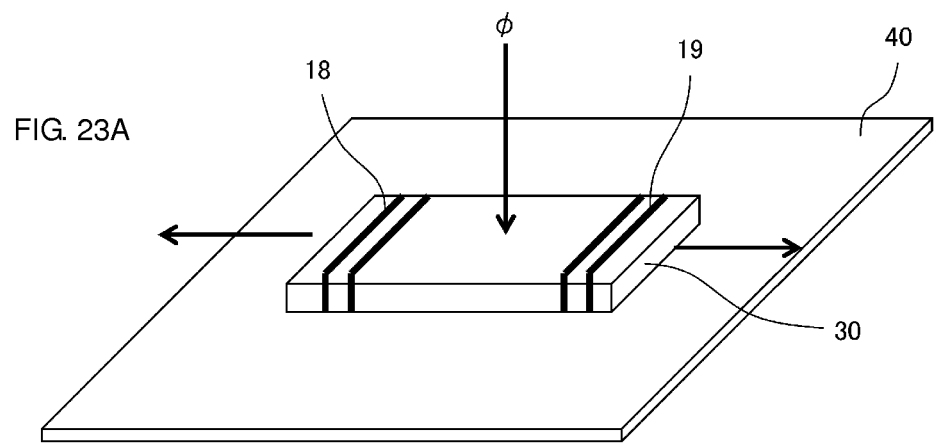
FIG. 23A is a perspective view of a path of a magnetic flux with the metal body 40 arranged close to the antenna module as the comparative example of FIG. 22.
Figure 23B:
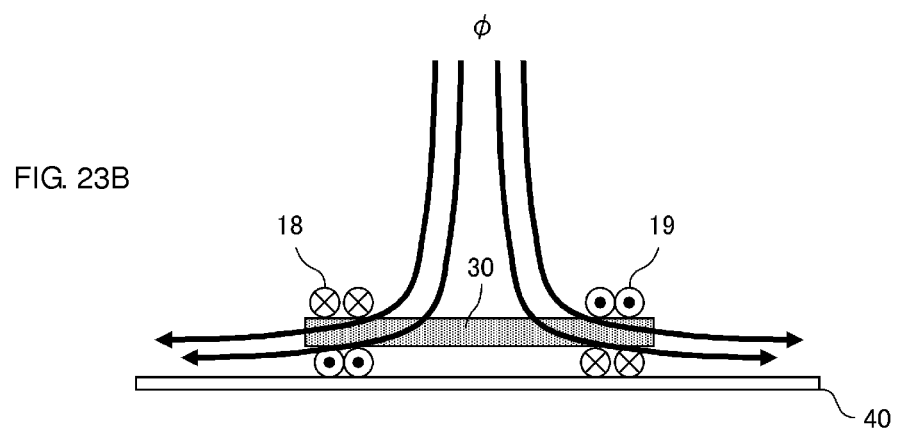
FIG. 23B is a sectional view taken from FIG. 23A.

FIG. 23A is a perspective view of a path of a magnetic flux with the metal body 40 arranged close to the antenna module as the comparative example of FIG. 22. FIG. 23B is a sectional view taken from FIG. 23A.

A comparison of FIG. 4B with FIG. 23B clearly indicates that a magnetic flux φ entering the metal body 40 in a vertical direction thereto flows in a lateral direction (in a plane direction) of the magnetic layer 30 in cross-section in each of FIG. 4B and FIG. 23B.

As illustrated above, in the antenna module 101 like the antenna module illustrated as the comparative example in FIG. 22A and FIG. 23A, the magnetic flux entering the surface of the metal in a vertical direction thereof flows along the plane of the metal. The magnetic flux entering a coil aperture of the first coil conductor 11 of the antenna module 101 flows through the gap between the first coil conductor 11 and the second coil conductor 12 in a lateral direction (in a plane direction), and thus interlinks with the first coil conductor 11.

The antenna module 101 according to a preferred embodiment of the present invention is different from the antenna module illustrated as the comparative example in FIG. 22A and FIG. 23A in that the magnetic flux entering the plane of the metal flows along the plane of the metal around 360°. The directivity of the antenna device 101 is thus wider, and an antenna module that suffers less from the eddy current loss in the nearby metal object thus results. The antenna module is useful as the one to be arranged on the surface of the metal.

Since the first coil conductor 11 and the second coil conductor 12 are connected in series in the antenna module 101 of the first preferred embodiment, a connection structure between the first coil conductor 11 and the second coil conductor 12 is simpler and permits the antenna module 101 to be connected to an external circuit via a two-electrode signal line.

The first coil conductor 11 and the second coil conductor 12 are provided on planar surfaces. The formation of the first coil conductor 11 and the second coil conductor 12 is easy, thus allowing the design of the whole antenna module to be thinner.

Since the first coil conductor 11 and the second coil conductor 12 are identical or substantially identical in pattern when viewed in a coil-wound axis direction, the degree of symmetry between the magnetic field generated in the first coil conductor 11 and the magnetic field generated in the second coil conductor 12 is increased. The magnetic flux that flows through the gap between the first coil conductor 11 and the second coil conductor 12 in the lateral directions (in the plane direction) is thus distributed along the plane direction of the coil apertures.

Second Preferred Embodiment

Figure 5:
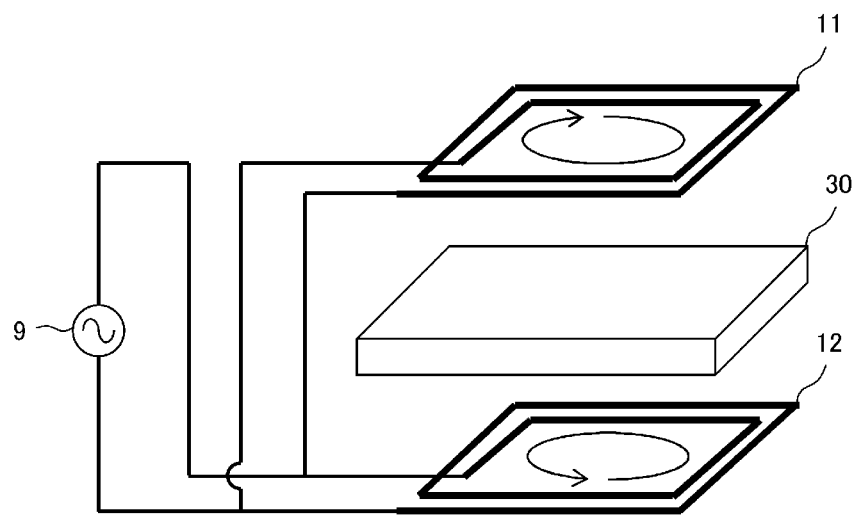
FIG. 5 illustrates a connection arrangement between the first coil conductor 11 and the second coil conductor 12 in an antenna module 102 according to a second preferred embodiment of the present invention.

FIG. 5 illustrates a connection arrangement between the first coil conductor 11 and the second coil conductor 12 in an antenna module 102 according to a second preferred embodiment of the present invention. As illustrated in FIG. 5, arrows denote the directions of current. In the first preferred embodiment, the first coil conductor 11 and the second coil conductor 12 preferably are connected in series, while the first coil conductor 11 and the second coil conductor 12 preferably are electrically connected in parallel with each other and then connected to the power supply circuit 9 in the antenna module 102 of the second preferred embodiment. As in the antenna module 101 of the first preferred embodiment, the first coil conductor and the second coil conductor 12 are connected so that the directions of the magnetic fluxes generated around the coil-wound axis direction of the first coil conductor 11 and the second coil conductor 12 are opposite to each other.

In this way, the first coil conductor 11 and the second coil conductor 12 may be connected in parallel as appropriate. With this arrangement, a low-impedance design is easily implemented.

Third Preferred Embodiment

Figure 6A:
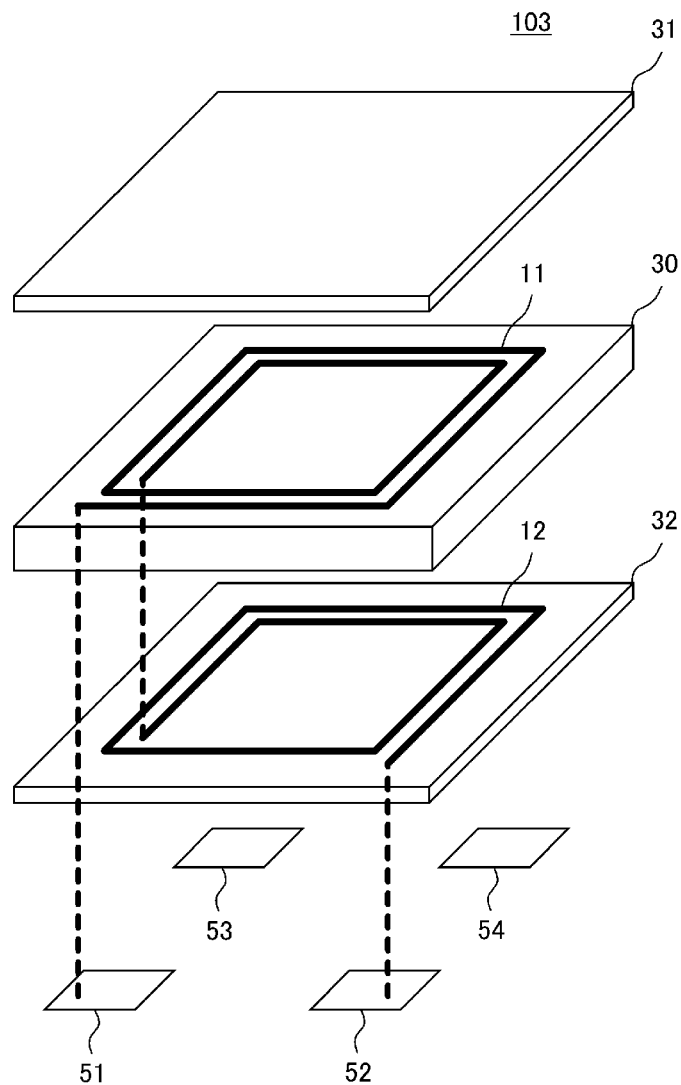
FIG. 6A is an exploded perspective view of an antenna module 103 according to a third preferred embodiment of the present invention.
Figure 6B:
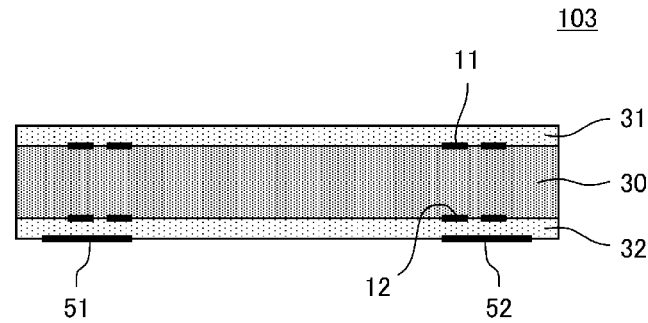
FIG. 6B is a sectional view of the antenna module 103.

FIG. 6A is an exploded perspective view of an antenna module 103. FIG. 6B is a sectional view of the antenna module 103. The antenna module 103 includes the first coil conductor 11, the second coil conductor 12 and the magnetic layer 30. The first coil conductor 11 is provided on the top surface of the magnetic layer 30. The second coil conductor 12 is provided on the top surface of a non-magnetic layer 32. Input and output terminals 51 and 52, and nonreserved mounted terminals 53 and 54 are provided on the bottom surface of the non-magnetic layer 32.

Non-magnetic layers 31 and 32 are made of dielectric ceramic, and the magnetic layer 30 is made of magnetic ceramic. As illustrated in FIG. 6B, the non-magnetic layers 31 and 32 and the magnetic layer 30 is laminated in a green sheet, and is then integrally sintered.

In this way, the first coil conductor 11 and the second coil conductor 12 may be combined with the magnetic layer 30 into a unitary body. With this arrangement, the elements are combined into a single flat-designed component, and the mounting of the component on a surface of a board is thus facilitated.

Fourth Preferred Embodiment

Figure 7A:
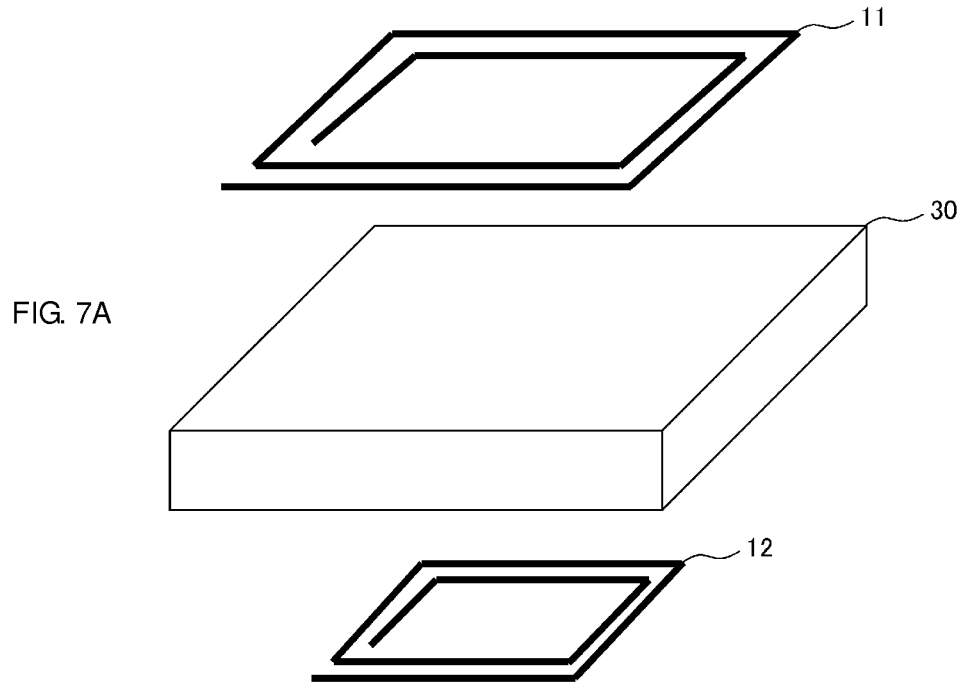
FIG. 7A is an exploded perspective view illustrating a size relationship between the first coil conductor 11 and the second coil conductor 12 in an antenna module of a fourth preferred embodiment.
Figure 7B:
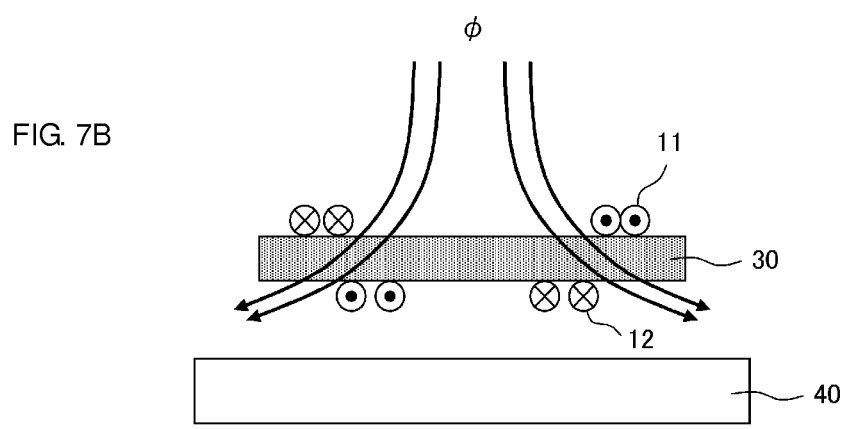
FIG. 7B is a sectional view of a path of a magnetic flux with the metal body 40 arranged close to the antenna module of FIG. 7A.

FIG. 7A is an exploded perspective view illustrating a size relationship between the first coil conductor 11 and the second coil conductor 12 in an antenna module according to a fourth preferred embodiment of the present invention. FIG. 7B is a sectional view of a path of a magnetic flux with the metal body 40 arranged close to the antenna module of FIG. 7A. In this example, the first coil conductor 11 and the second coil conductor 12 are aligned with the same coil-wound axis, but a winding area of the second coil conductor 12 is smaller than a winding area of the first coil conductor 11.

If the metal body 40 is arranged closer to the second coil conductor 12 with a gap wide to some degree maintained between the metal body 40 and the second coil conductor 12 as illustrated in FIG. 7B, the magnetic flux φ flows between the magnetic layer 30 and the metal body 40. This arrangement controls an eddy current flowing through the metal body 40.

Figure 8A:
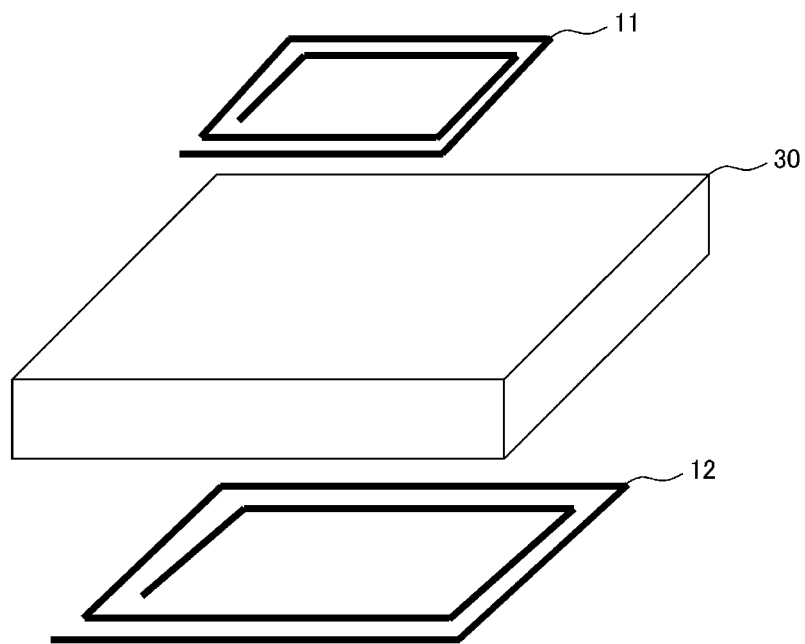
FIG. 8A is an exploded perspective view illustrating a size relationship between the first coil conductor 11 and the second coil conductor 12 in another antenna module according to the fourth preferred embodiment of the present invention.
Figure 8B:
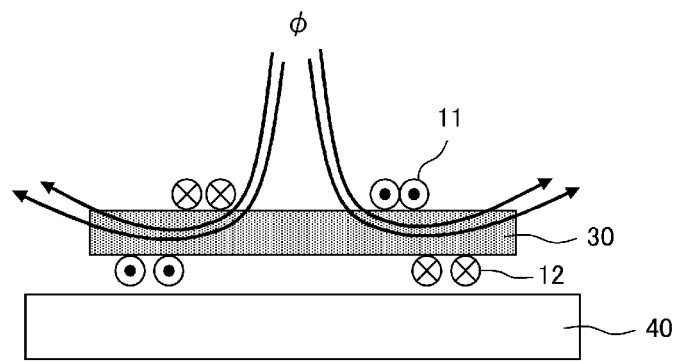
FIG. 8B is a sectional view of a path of a magnetic flux with the metal body 40 arranged close to the antenna module of FIG. 8A.

FIG. 8A is an exploded perspective view illustrating a size relationship between the first coil conductor 11 and the second coil conductor 12 in another antenna module according to the fourth preferred embodiment of the present invention. FIG. 8B is a sectional view of a path of a magnetic flux with the metal body 40 arranged close to the antenna module. In this example, the first coil conductor 11 and the second coil conductor 12 preferably are aligned with the same coil-wound axis but a winding area of the first coil conductor 11 is smaller than a winding area of the second coil conductor 12.

Even if the metal body 40 is extremely close to the second coil conductor 12 as illustrated in FIG. 8B, the magnetic flux φ flows in a lateral direction of the magnetic layer 30 and away from the metal body 40. Even if the metal body 40 is arranged extremely close to the antenna module, the eddy current flowing through the metal body 40 is controlled. When a metal body, such as a battery pack, thicker than the antenna module, is arranged lateral to the antenna module, the eddy current flowing through the metal object is controlled.

Fifth Preferred Embodiment

Figure 9A:
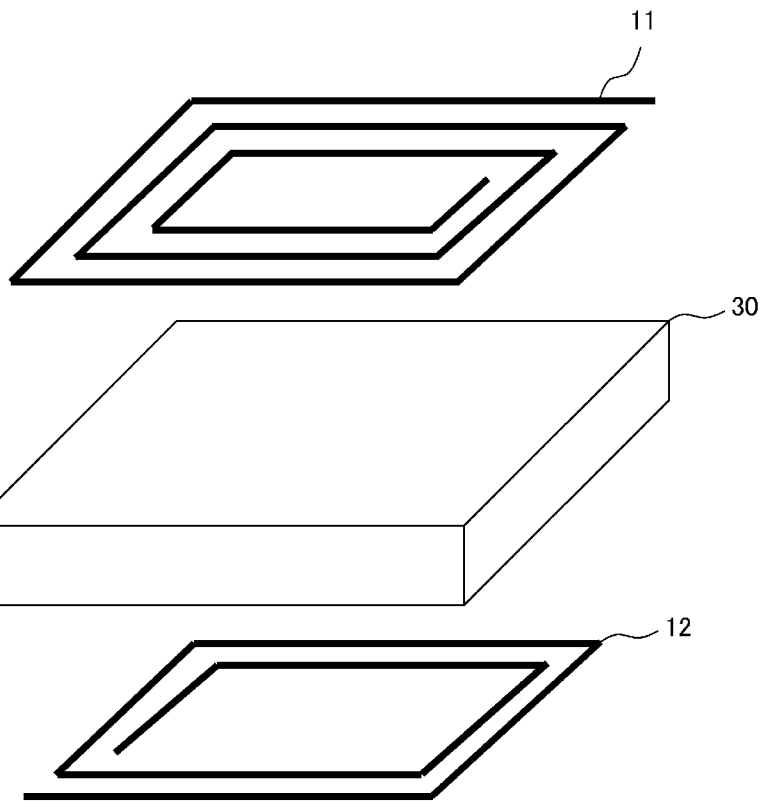
FIG. 9A is an exploded perspective view illustrating a difference between the numbers of windings of the first coil conductor 11 and the second coil conductor 12 in another antenna module according to a fifth preferred embodiment of the present invention.
Figure 9B:
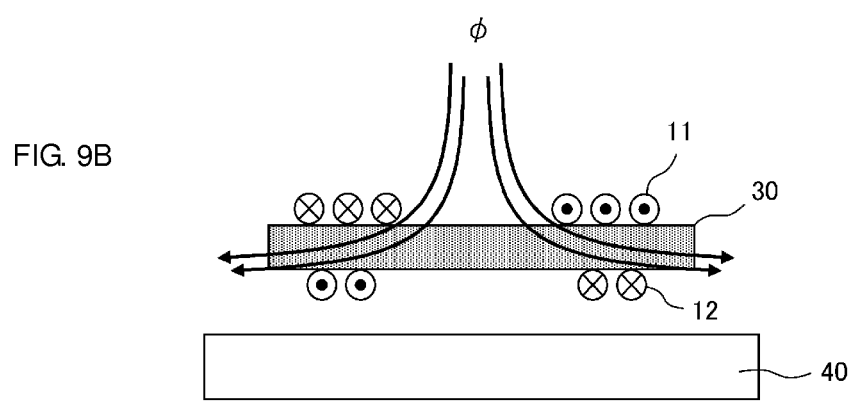
FIG. 9B is a sectional view of a path of magnetic flux with the metal body 40 arranged close to the antenna module of FIG. 9A.

FIG. 9A is an exploded perspective view illustrating a difference between the numbers of windings of the first coil conductor 11 and the second coil conductor 12 in another antenna module according to a fifth preferred embodiment of the present invention. FIG. 9B is a sectional view of a path of a magnetic flux with the metal body 40 arranged close to the antenna module. In this example, the first coil conductor 11 and the second coil conductor 12 are aligned with the same coil-wound axis but the number windings of the first coil conductor 11 is larger than the number of windings of the second coil conductor 12. In this way, the first coil conductor 11 and the second coil conductor 12 may be different in the number of windings.

Figure 10A:
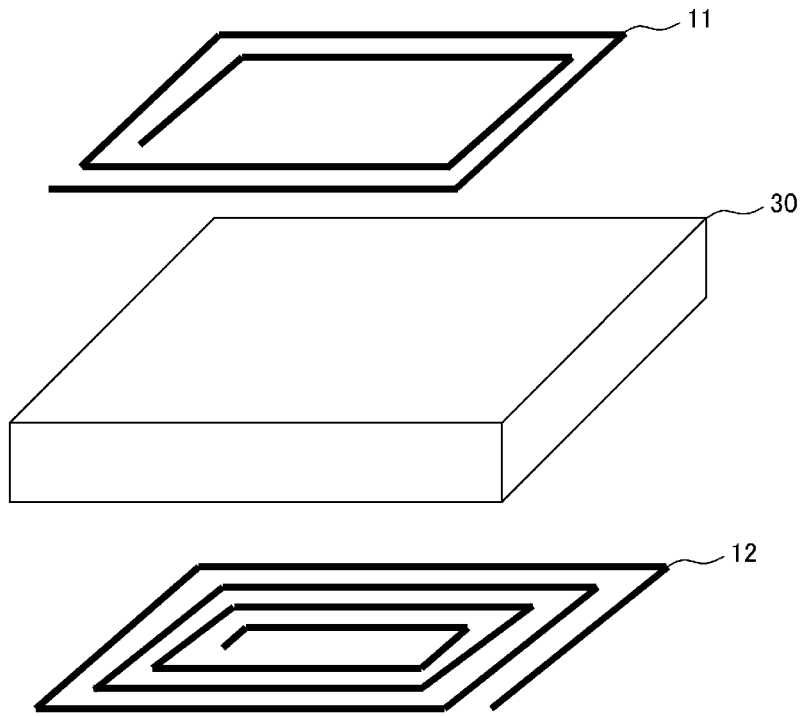
FIG. 10A is an exploded perspective view illustrating a difference between the numbers of windings of the first coil conductor 11 and the second coil conductor 12 in another antenna module according to the fifth preferred embodiment of the present invention.
Figure 10B:
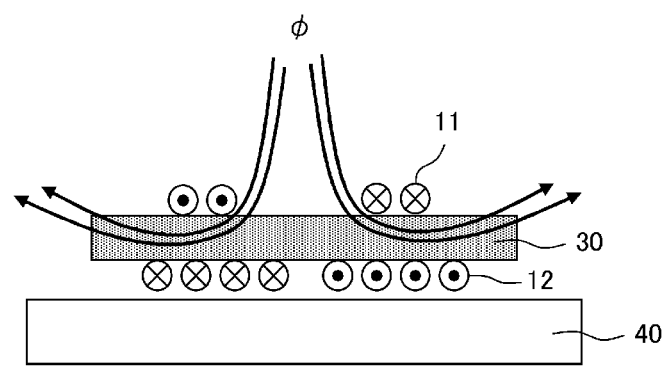
FIG. 10B is a sectional view of a path of a magnetic flux with the metal body 40 arranged close to the antenna module of FIG. 10A.

FIG. 10A is an exploded perspective view illustrating a difference between the numbers of windings of the first coil conductor 11 and the second coil conductor 12 in another antenna module according to the fifth preferred embodiment. FIG. 10B is a sectional view of a path of a magnetic flux with the metal body 40 arranged close to the antenna module. In this example, the first coil conductor 11 and the second coil conductor 12 are aligned with the same coil-wound axis but a winding area of the second coil conductor 12 is wider than a winding area of the first coil conductor 11.

If the coil aperture of the second coil conductor 12 is smaller as illustrated in FIG. 10B, the magnetic flux intersecting a formation surface of the second coil conductor 12 is decreased. Even if the metal body 40 is arranged extremely close to the antenna module, the eddy current flowing in the metal body 40 is controlled. When a metal body, such as a battery pack, thicker than the antenna module, is arranged lateral to the antenna module, the eddy current flowing in the metal object is controlled.

Sixth Preferred Embodiment

Figure 11A:
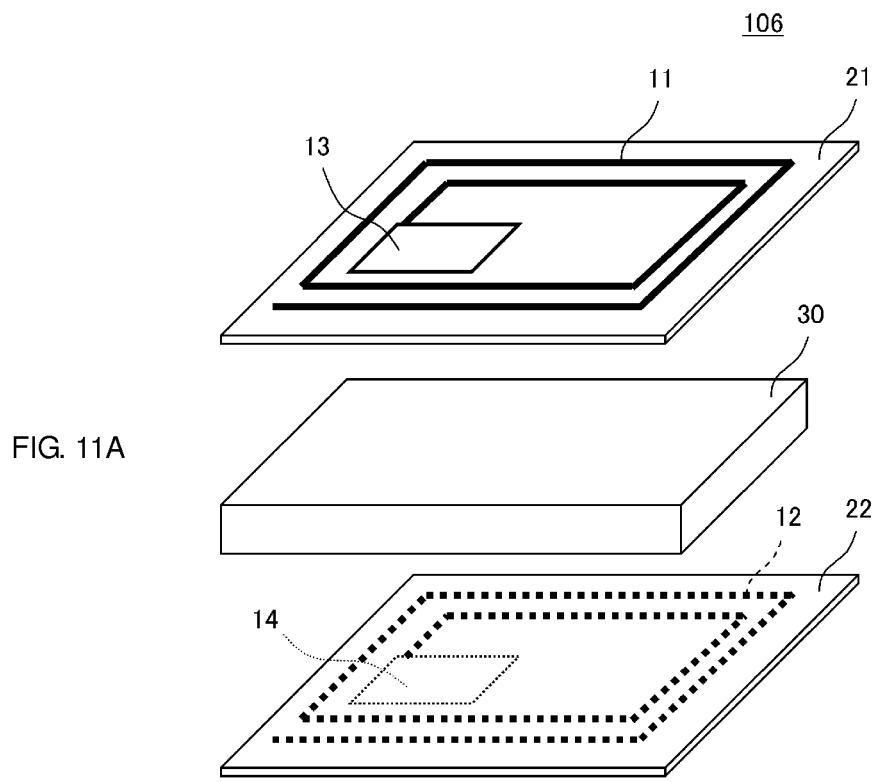
FIG. 11A is an exploded perspective view of an antenna module 106 according to a sixth preferred embodiment of the present invention.

FIG. 11A is an exploded perspective view of an antenna module 106 according to a sixth preferred embodiment of the present invention. The antenna module 106 includes the first coil conductor 11, the second coil conductor 12, and the magnetic layer 30. The first coil conductor 11 is provided on the top surface of the base body 21 as a non-magnetic sheet. The second coil conductor 12 is provided on the bottom surface of the base body 22 as a non-magnetic sheet.

A capacitance generating electrode 13 is provided on the base body 21, and the capacitance generating electrode 13 is connected to an inner peripheral end of the first coil conductor 11. A capacitance generating electrode 14 is provided on the base body 22, and the capacitance generating electrode 14 is connected to an inner peripheral end of the second coil conductor 12. The capacitance generating electrodes 13 and 14 are opposed to each other in alignment via with the base bodies 21 and 22 and the magnetic layer 30 interposed therebetween.

Figure 11B:
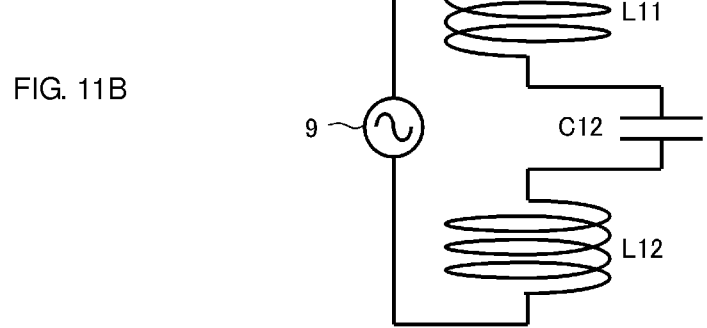
FIG. 11B is an equivalent circuit diagram of the antenna module 106.

FIG. 11B is an equivalent circuit diagram of the antenna module 106. An inductor L11 herein corresponds to the first coil conductor 11 and an inductor L12 corresponds to the second coil conductor 12. A capacitor C12 corresponds to a capacitance generated between the capacitance generating electrodes 13 and 14. The arrangement eliminates the need for a wiring that directly connects the first coil conductor 11 and the second coil conductor 12, and the antenna module becomes easy to manufacture.

Seventh Preferred Embodiment

Figure 12:
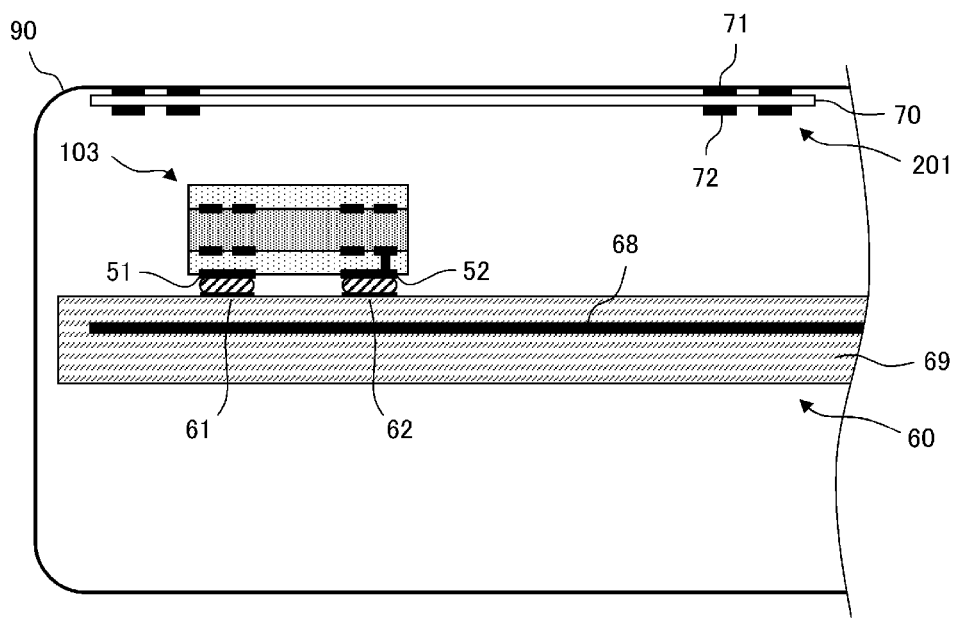
FIG. 12 is a sectional view of a major portion of a radio communication device according to a seventh preferred embodiment of the present invention.

FIG. 12 is a sectional view of a major portion of a radio communication device according to a seventh preferred embodiment of the present invention. The radio communication device may be a mobile telephone terminal, for example. A board 60 is arranged in a housing 90. An antenna module 103 is mounted on the top surface of the board 60 as illustrated in FIG. 12 (the bottom surface in an actual operation state). A resonant booster 201 is glued on the inner surface of the housing 90.

The antenna module 103 preferably is the one in the third preferred embodiment illustrated in FIG. 6. The board 60 includes a base body 69 and a variety of electrodes provided in the base body 69. Input and output terminals 51 and 52 of the antenna module 103 are soldered to mounted pad electrodes 61 and 62 on the board. A ground conductor 68 expands on almost entire plane of the board 60.

Figure 13A:
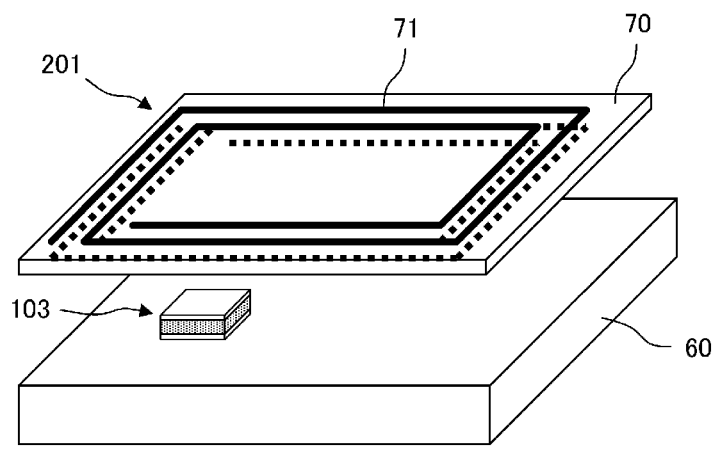
FIG. 13A is a perspective view illustrating a positional relationship of a board 60, an antenna module 103 and a resonant booster 102.
Figure 13B:
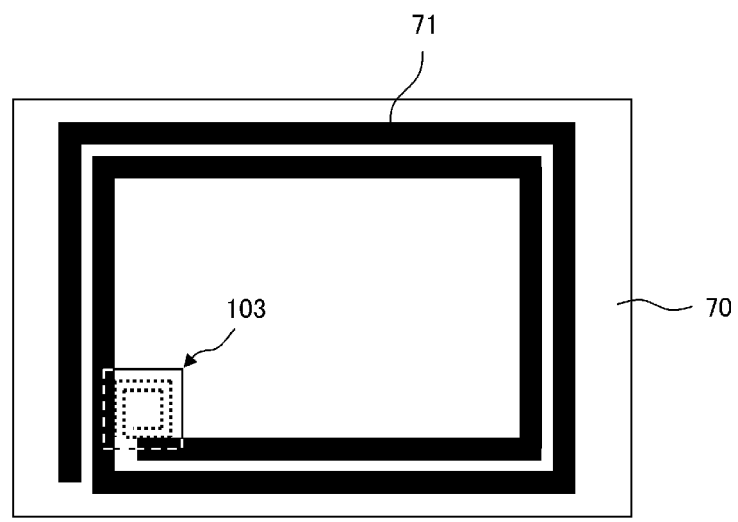
FIG. 13B is a plan view of the antenna module viewed from the side of the resonant booster with the housing thereof removed.
Figure 14:
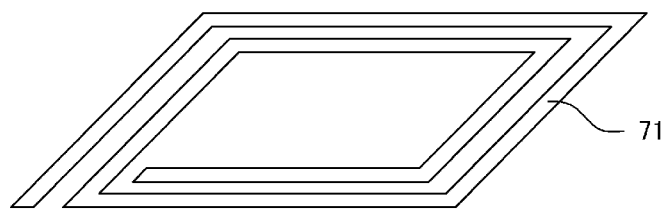
FIG. 14 is an exploded perspective view of a resonant booster 201.
Figure 14:
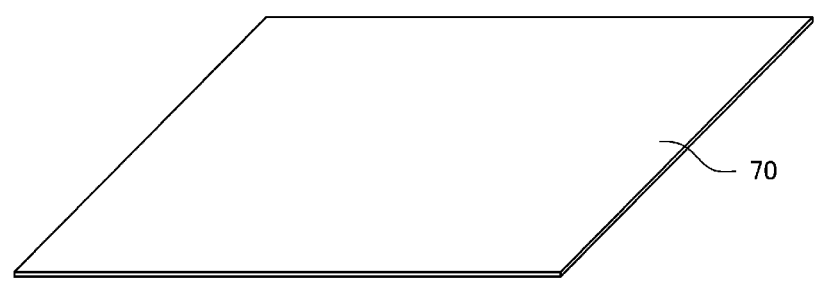
Figure 14:
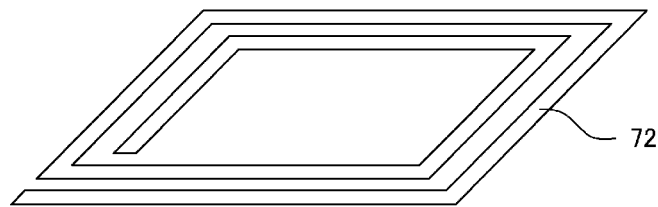

FIG. 13A is a perspective view illustrating a positional relationship between the board 60, the antenna module 103 and the resonant booster 201. FIG. 13B is a plan view of the antenna module 103 viewed from the side of the resonant booster 201 with the housing thereof removed. FIG. 14 is an exploded perspective view of the resonant booster 201.

As illustrated in FIG. 14, the resonant booster 201 includes a base body sheet 70 of PET or the like, a coil conductor 71 provided on the top surface of the base body sheet 70 and a coil conductor 72 provided on the bottom surface of the base body sheet 70. In this example, each of the coil conductor 71 and the coil conductor 72 is a planar coil.

The coil conductor 71 and the coil conductor 72 are wound in a pattern that causes the directions of the currents flowing through the coil conductors to be the same when the current flow from one end to the other end of each of the coil conductors. The coil conductors 71 and 72 are arranged so that the coil conductors at least partly overlap each other when viewed in the coil-wound axis direction thereof. As a result, the coil conductors 71 and 72 are coupled with each other via capacitance.

Figure 15:
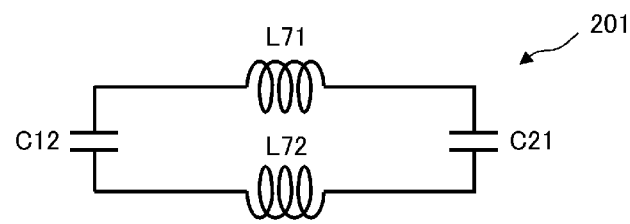
FIG. 15 is an equivalent circuit diagram of the antenna module 103 and the resonant booster 201 with a power supply circuit 9 connected the antenna device 103.
Figure 15:
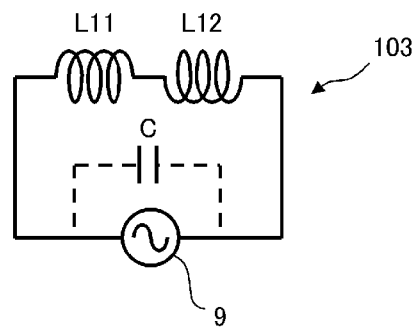

FIG. 15 is an equivalent circuit diagram of the antenna module 103 and the resonant booster 201 with the power supply circuit 9 connected thereto. A power supply side including the power supply circuit 9 and the antenna module 103 includes an LC resonance circuit including a stray capacitance of an RFID IC chip itself, a matching capacitor C, and inductances L11 and L12 of the coil conductors. The resonance frequency of the LC resonance circuit preferably is set to be equal or substantially equal to a carrier frequency (13.56 MHz) of a communication signal, for example. The resonant booster 201 includes an LC resonance circuit including a inductance L71 of the coil conductor 71, an inductance L72 of the coil conductor 72, and capacitances C12 and C21 between the coil conductor 71 and the coil conductor 72. The resonance frequency of the LC resonance circuit preferably is set to be close to the carrier frequency (13.56 MHz) of the communication signal. The antenna module 103 and the resonant booster 201 are mutually magnetically coupled.

Figure 16:
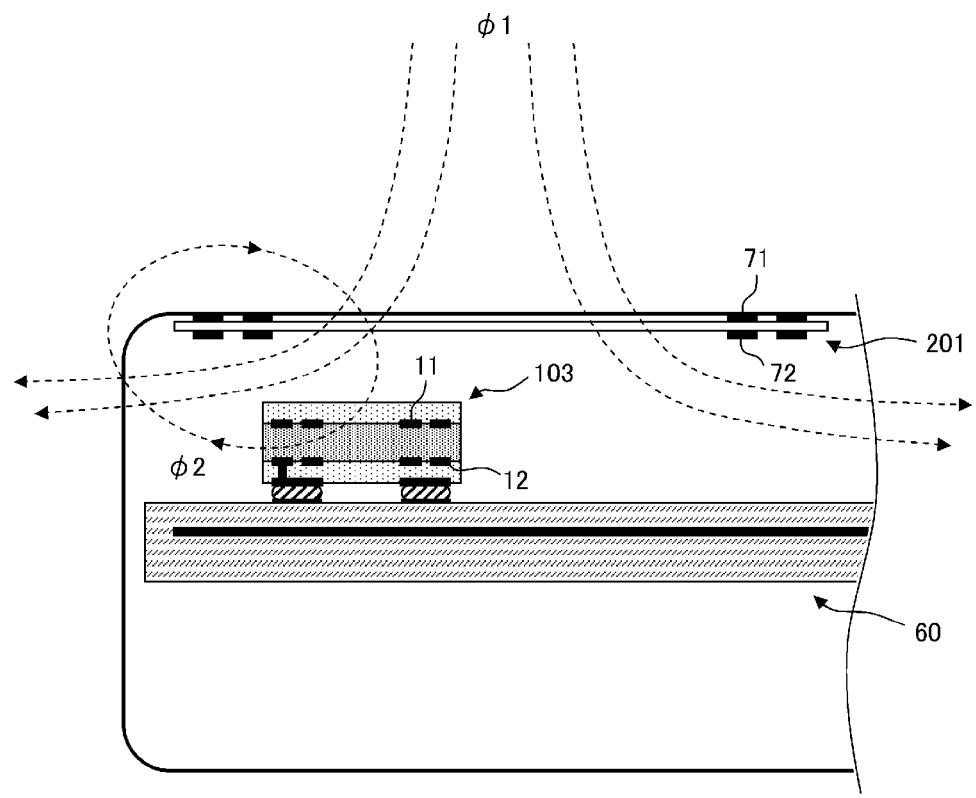
FIG. 16 illustrates the state of coupling between the antenna module 103 and the resonant booster 201.

FIG. 16 illustrates the state of coupling between the antenna module 103 and the resonant booster 201. The magnetic flux φ1 entering the board 60 in a vertical direction thereto from the antenna of a communication partner interlinks with the coil conductors 71 and 72 of the resonant booster 201. The antenna of the communication partner is thus magnetically coupled with the resonant booster 201. A magnetic flux φ2 generated by a current flowing through the coil conductors 71 and 72 of the resonant booster 201 interlinks with the first coil conductor 11 in the antenna module 103, and the resonant booster 201 is thus magnetically coupled with the antenna module 103. In the discussion herein, an antenna including the resonant booster 201 and the antenna module 103 serves as a receive antenna. Because of dual-function property of antenna, the same coupling is achieved if the antenna is used as a transmit antenna.

Since the coil aperture of each of the coil conductors 71 and 72 in the resonant booster 201 is larger than the coil aperture of the first coil conductor 11 in the antenna module 103, the resonant booster 201 is strongly coupled with the antenna of the communication partner. An overall gain by the resonant booster 201 and the antenna module 103 thus increases.

Eighth Preferred Embodiment

Figure 17:
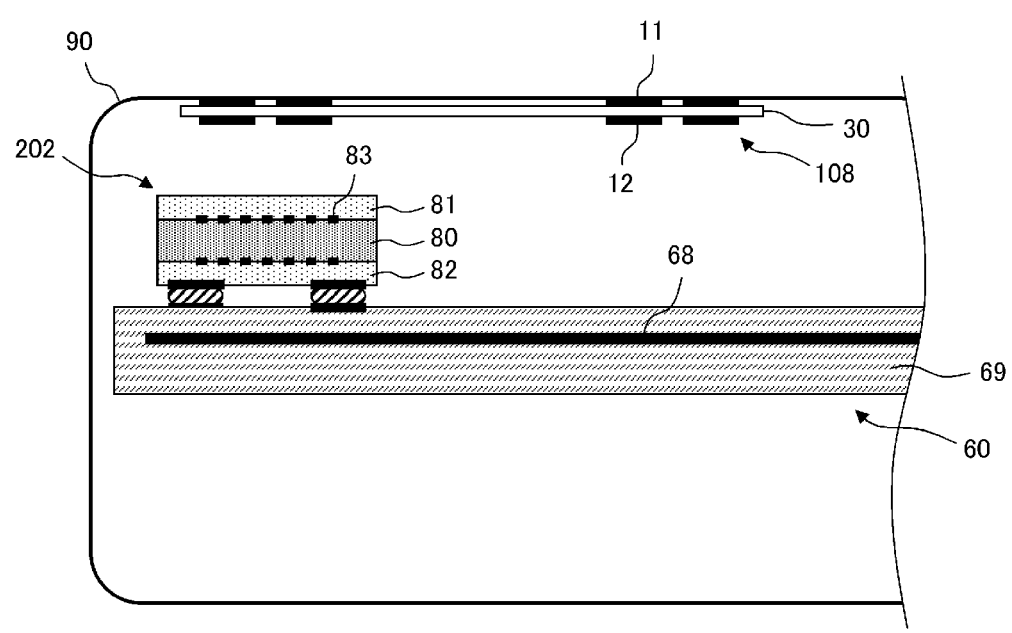
FIG. 17 is a sectional view of a major portion of a radio communication device according to an eighth preferred embodiment of the present invention.

FIG. 17 is a sectional view of a major portion of a radio communication device according to an eighth preferred embodiment of the present invention. The radio communication device may be a mobile telephone terminal, for example. A board 60 is arranged in a housing 90. A power supply antenna 202 is mounted on the top surface of the board 60 as illustrated in FIG. 18 (the bottom surface in an actual operation state). An antenna module 108 as a resonant booster is glued on the inner surface of the housing 90.

Input and output terminals of the power supply antenna 202 are soldered to mounted pad electrodes on the board. A ground conductor 68 expands on almost entire plane of the board 60.

Figure 18A:
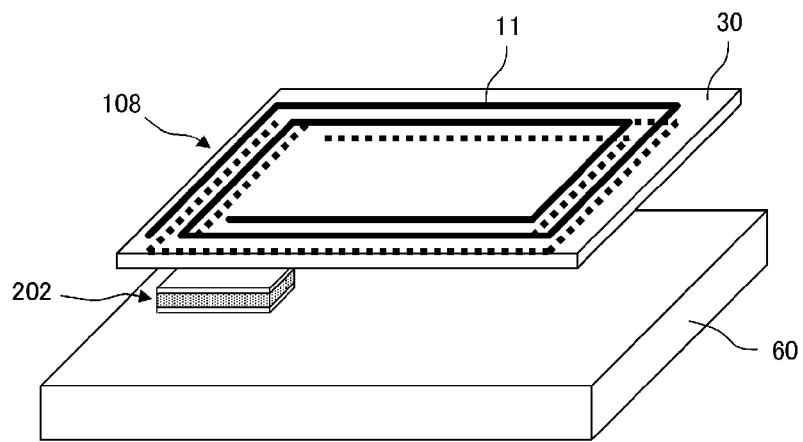
FIG. 18A is a perspective view illustrating a positional relationship of a board 60, a power supply antenna 202, and an antenna module 108.
Figure 18B:
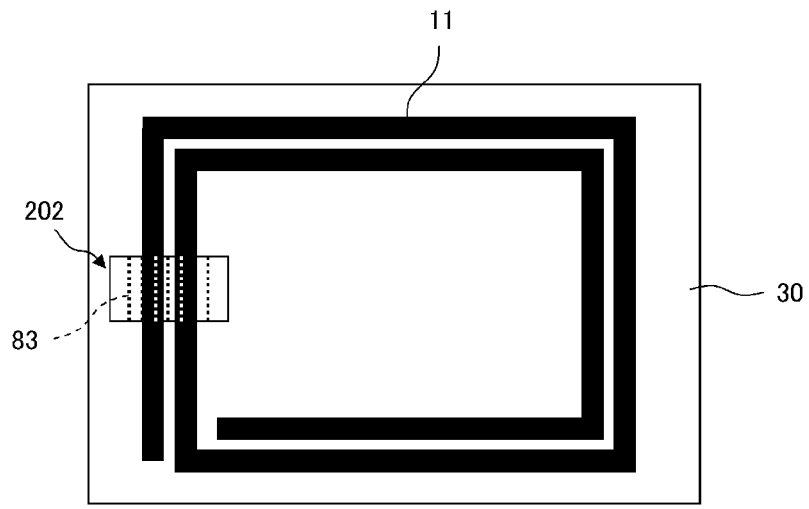
FIG. 18B is a plan view of the radio communication device viewed from the side of the antenna module 108 with the housing thereof removed.
Figure 19A:
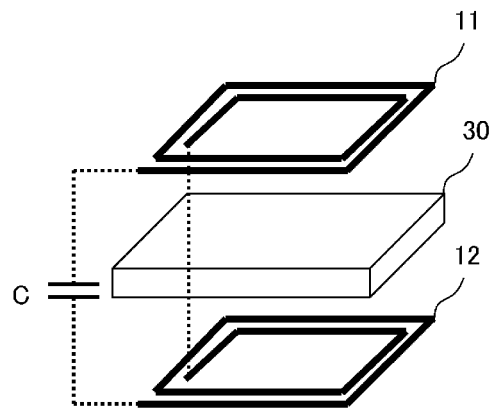
FIG. 19A is an exploded perspective view of the antenna module 108.
Figure 19B:
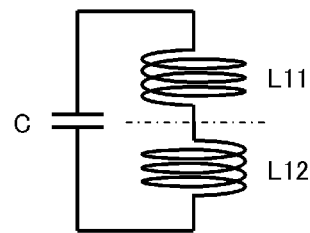
FIG. 19B is an equivalent circuit diagram of the antenna module 108.

FIG. 18A is a perspective view illustrating a positional relationship of the board 60, the power supply antenna 202, and the antenna module 108. FIG. 18B is a plan view of the communication apparatus viewed from the side of the antenna module 108 with the housing thereof removed. FIG. 19A is an exploded perspective view of the antenna module 108. FIG. 19B is an equivalent circuit diagram of the antenna module 108.

As illustrated in FIG. 19A, the antenna module 108 as a resonant booster includes the first coil conductor 11, the second coil conductor 12, and the magnetic layer 30. The first coil conductor 11 and the second coil conductor 12 are arranged via the magnetic layer 30 interposed therebetween so that the coil apertures thereof are opposed to each other in alignment. In this example, the coil inner periphery end of the first coil conductor 11 is connected to the coil inner periphery end of the second coil conductor 12 while the coil outer periphery ends of the first coil conductor 11 and the second coil conductor 12 remain opened. A capacitance is generated between the first coil conductor 11 and the second coil conductor 12. As illustrated in FIG. 19B, an inductor L11 corresponds to the first coil conductor 11 and an inductor L12 corresponds to the second coil conductor 12, and a capacitor C corresponds to the capacitance generated between the first coil conductor 11 and the second coil conductor 12. The resonance frequency of an LC resonance circuit including the inductors L11 and L12 and the capacitor C is set to be a frequency close to the carrier frequency of the communication signal.

As illustrated in FIG. 17 and FIG. 18B, the power supply antenna 202 includes a magnetic layer 80 and a coil conductor 83 wound around the magnetic layer 80. The power supply antenna 202 is mounted on the board 60 so that the coil-wound axis of the coil conductor 83 is parallel or substantially parallel with the plane of the board 60.

Figure 20:
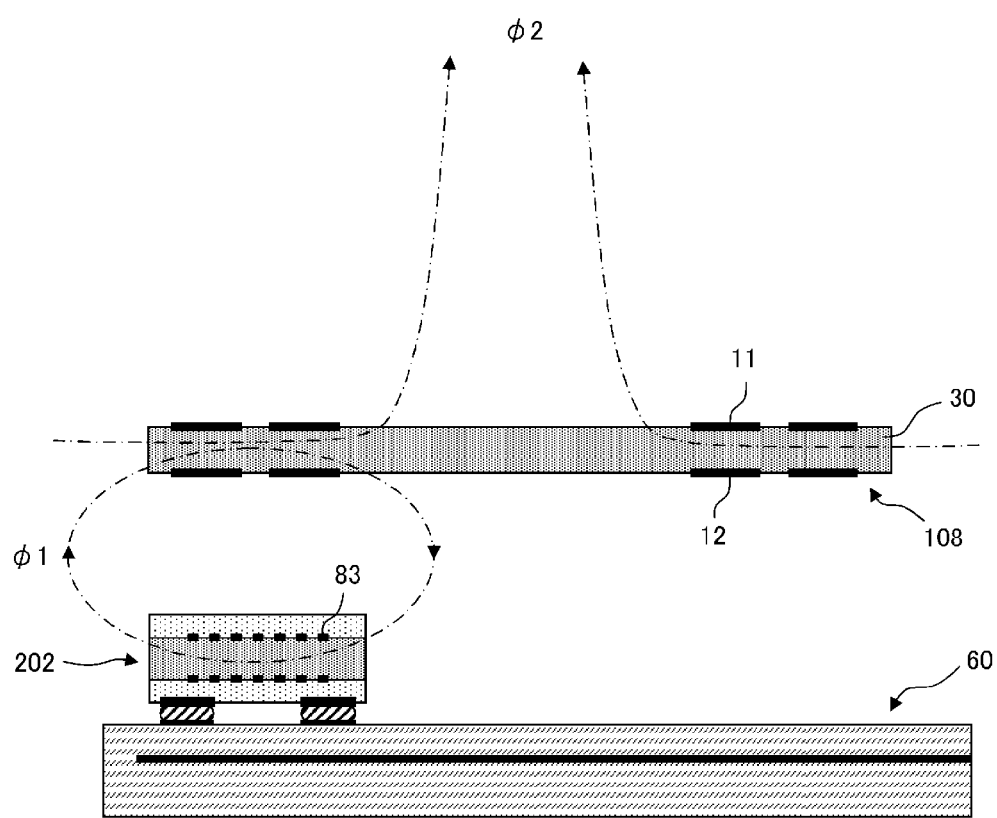
FIG. 20 illustrates the state of coupling between the power supply antenna 202 and the antenna module 108.

FIG. 20 illustrates the state of coupling between the power supply antenna 202 and the antenna module 108. A magnetic flux φ1 generated by the power supply antenna interlinks with the second coil conductor 12 of the antenna module 108 serving as a resonant booster, thus causing the power supply antenna 202 to be magnetically coupled with the antenna module 108. A magnetic flux φ2 generated by a current flowing through the first coil conductor 11 of the antenna module 108 interlinks with the antenna of a communication partner, thus causing the antenna module 108 to be magnetically coupled with the antenna of the communication partner.

Since the coil aperture of the coil conductors 11 and of the antenna module 108 serving as a resonant booster is larger in size than the coil aperture of the coil conductor 83 of the power supply antenna 202, the antenna module 108 is strongly coupled with the antenna of the communication partner, and an overall gain by the antenna module 108 and the power supply antenna 202 is thus increased.

In the example of FIG. 20, an antenna including the antenna module 108 and the power supply antenna 202 serves as a transmit antenna. Because of dual-function property of antenna, the same coupling is achieved if the antenna is used as a receive antenna.

Ninth Preferred Embodiment

Figure 21:
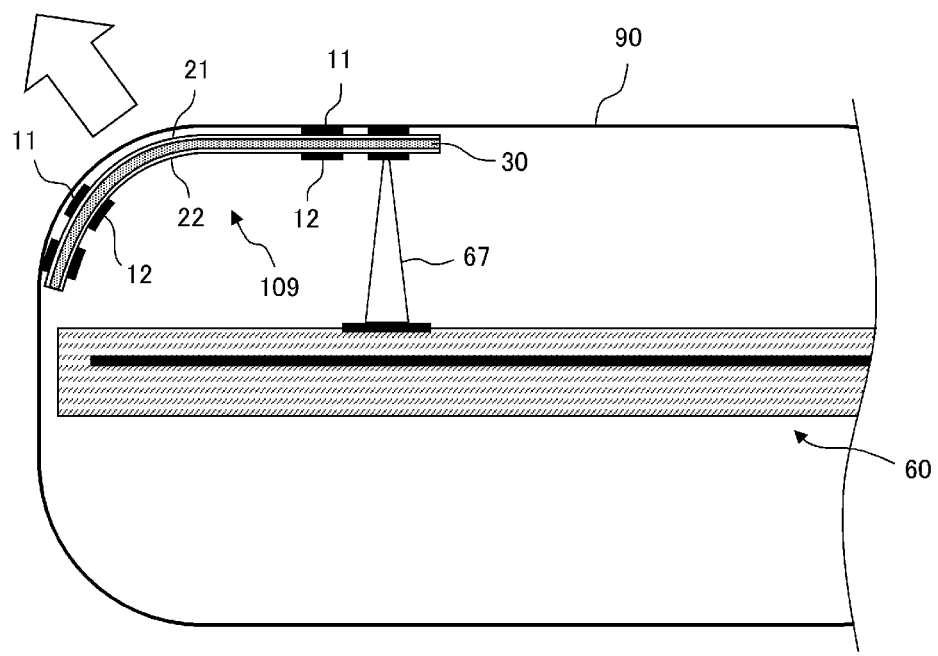
FIG. 21 is a sectional view of a major portion of a radio communication device according to a ninth preferred embodiment of the present invention.

FIG. 21 is a sectional view of a major portion of a radio communication device according to a ninth preferred embodiment of the present invention. In each of the preferred embodiments described heretofore, a planar design is preferably used. The present invention is not limited to the planar design. The coil aperture of each of the first coil conductor 11 and the second coil conductor 12 and the magnetic layer 30 may be curved, for example.

Referring to FIG. 21, an antenna module 109 is disposed (glued) along a curved surface of a housing 90 of the radio communication device. With the housing having the antenna module 109 glued thereto and covering the radio communication device, the antenna module 109 is connected to a circuit on the board 60 via a pin terminal 67.

A basic structure of the antenna module 109 preferably is identical to the antenna module of the first preferred embodiment. The first coil conductor 11 is provided on a flexible resin base body 21, and the second coil conductor 12 is provided on a flexible resin base body 22. The magnetic layer 30 is a flexible magnetic resin sheet with a magnetic filler dispersed therein. The first end of the first coil conductor 11 is connected to the first end of the second coil conductor 12 via an inter-layer connection conductor disposed in the magnetic layer 30. The second end of the first coil conductor 11 is extended to the surface of the base body 22 via an inter-layer connection conductor disposed in the magnetic layer 30. The second end of the second coil conductor 12 is connected to a power supply circuit (RFIC chip) via the first pin terminal 67. The second end of the first coil conductor 11 is also connected via a second pin terminal to a power supply circuit disposed on the board 60.

Since the antenna module 109 is curved along one surface of the housing in the example of FIG. 21, the antenna module 109 has directivity in a direction denoted by an arrow. For this reason, the antenna module 109 has directivity that is suitable for use in an operation in which the surface of the housing is placed in contact with a reader unit of a communication partner device.

Tenth Preferred Embodiment

Figure 24:
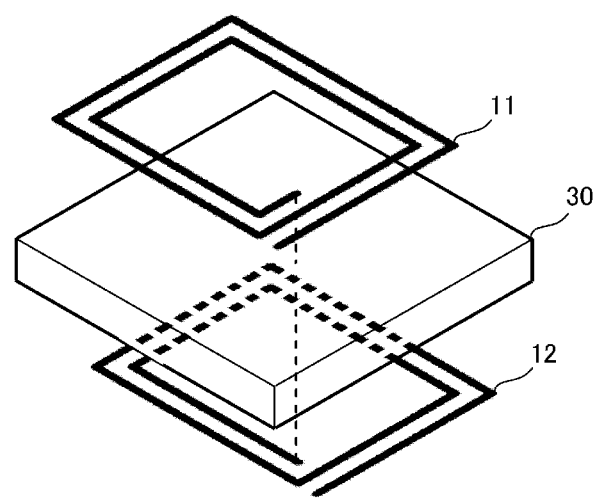
FIG. 24 is an exploded perspective view of an antenna module 110 according to a tenth preferred embodiment of the present invention.

FIG. 24 is an exploded perspective view of an antenna module 110 according to a tenth preferred embodiment of the present invention. The antenna module 110 includes the first coil conductor 11 provided on the top surface of the magnetic layer 30 and the second coil conductor 12 provided on the bottom surface of the magnetic layer 30. The first coil conductor 11 and the second coil conductor 12 are similar in pattern, but the centers of the coil apertures thereof are shifted from each other in plan view.

Figure 25A:
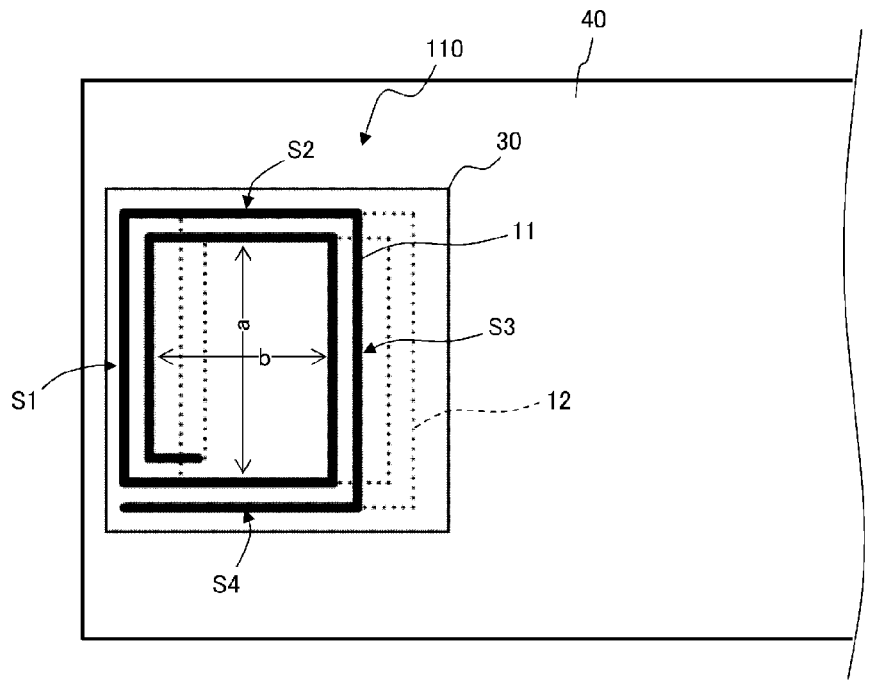
FIG. 25A is a plan view of the antenna module 110 that is arranged close to a planar metal body 40.
Figure 26:
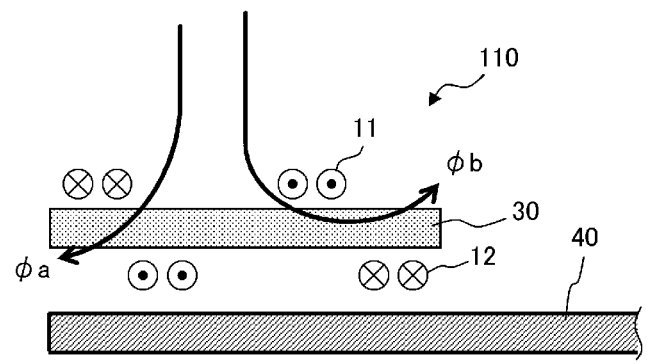
FIG. 26 is a sectional view of a path of a magnetic flux with the planar metal body 40 arranged close to the antenna module 110.

FIG. 25A is a plan view of the antenna module 110 that is arranged close to a planar metal body 40. FIG. 26 is a sectional view of a path of a magnetic flux with the planar metal body 40 arranged close to the antenna module 110.

In plan view of the coil conductor and the planar metal body 40 as illustrated in FIG. 25A, the first coil conductor 11 is arranged close to a side portion (edge) of the planar metal body 40, a side portion of the first coil conductor 11 is closer to the side portion of the metal body 40 than a side portion of the second coil conductor 12, and the centers of the coil apertures of the coil conductors 11 and 12 opposed to each other are shifted from each other in plan view (the center of the coil aperture of the first coil conductor 11 is closer to the side portion of the planar metal body 40 than the center of the coil aperture of the second coil conductor 12). As a magnetic flux φa of FIG. 26, a magnetic field flows easily by the side portion of the metal body 40. As represented by a magnetic flux φb, unnecessary coupling with the metal body 40 is controlled.

The coil conductors 11 and 12 may be different in electrode width and electrode gap. For example, the electrode width of sides S2 and S4 of the first coil conductor 11, connected to side S1 closest to the side portion of the planar metal body 40, may be narrower than the electrode width of the sides S1 and S3 of the first coil conductor 11 as illustrated in FIG. 25A. The electrode pitch of the sides S2 and S4 may be set to be smaller than the electrode pitch of the sides S1 and S3. In this way, the magnetic flux more easily flows through (interlinks with) the coil aperture. More specifically, more magnetic flux will flow through the coil aperture on the side S1 that is closer to the side portion of the metal body 40. Setting dimension a to be longer than dimension b of the coil aperture is effective to increase an effective coil aperture. For this reason, the electrode width and the electrode pitch may be determined as described above.

Figure 25B:
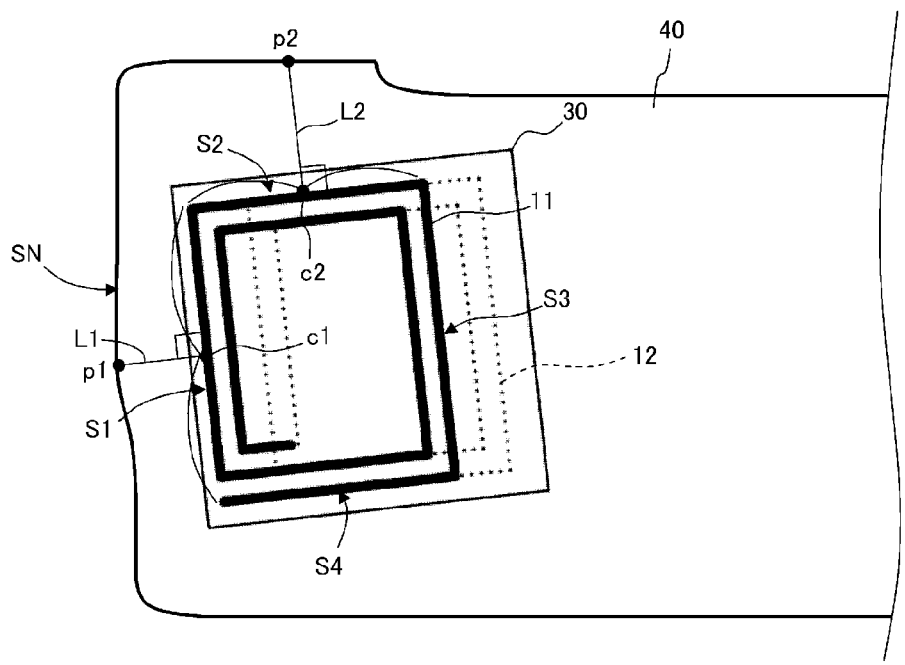
FIG. 25B is a plan view of the antenna module 110 and the metal body 40 in another layout state.

FIG. 25B is a plan view of the antenna module 110 and the metal body 40 in another layout state. As illustrated in FIG. 25B, the side S1 of the outline of the first coil conductor 11 closest to the side portion of the metal body 40 may be non-parallel with a side SN of a side portion of a metal body.

If a perpendicular line L1 passing through the midpoint c1 of the side S1 of the outline of the first coil conductor 11 is drawn, the length between an intersection p1 of the perpendicular line L1 with the side of the metal body 40 and the midpoint c1 of the side S1 is a distance between the side S1 and the side of the metal body 40. Also, if a perpendicular line L2 passing through the midpoint c2 of the side S2 of the outline of the first coil conductor 11 is drawn, the length between an intersection p2 of the perpendicular line L2 with the side of the metal body 40 and the midpoint c2 of the side S2 is a distance between the side S2 and the side of the metal body 40. The distance between each of the sides (sides S1 through S4) of the outline of the first coil conductor 11 and the corresponding side of the metal body 40 is calculated, and the side having the shortest distance is the "side of the outline of the first coil conductor 11 closest to the side of the metal body 40".

In the same manner as with the preferred embodiments described heretofore, the metal body 40 may be the ground of a printed wiring board arranged in the housing of the communication terminal, or a conductor plate such as a power pack or a shield case. The metal body 40 may also be part of a metal housing.

Eleventh Preferred Embodiment

Figure 27:
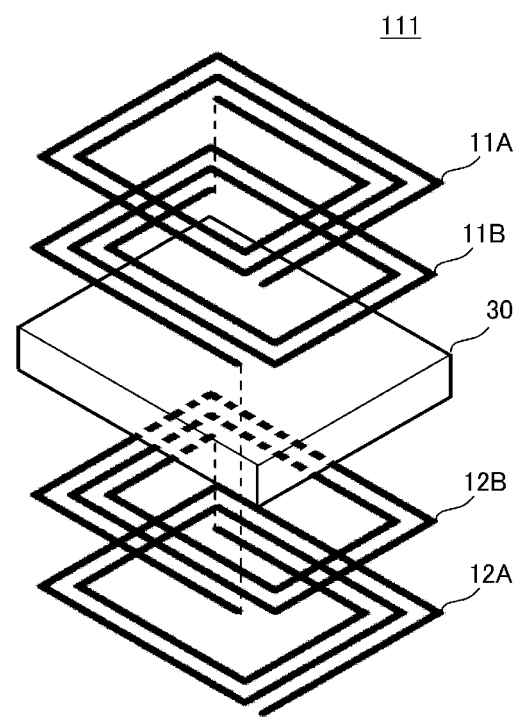
FIG. 27 is an exploded perspective view of an antenna module 111 according to an eleventh preferred embodiment of the present invention.
Figure 28:
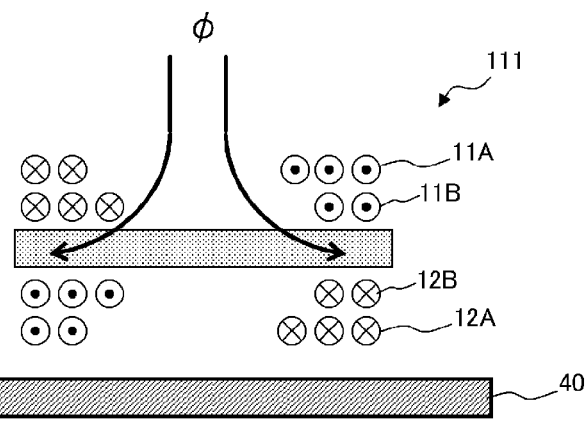
FIG. 28 is a sectional view of a path of a magnetic flux with the planar metal body 40 arranged close to the antenna module 111.

FIG. 27 is an exploded perspective view of an antenna module 111 according to an eleventh preferred embodiment of the present invention. FIG. 28 is a sectional view of a path of a magnetic flux with the planar metal body 40 arranged close to the antenna module 111.

The antenna module 111 includes first coil conductors 11A and 11B provided on the top surface of the magnetic layer 30 and second coil conductors 12A and 12B provided on the bottom surface of the magnetic layer 30. The first coil conductors 11A and 11B and the second coil inductors 12A and 12B may be arranged in a laminate structure. As a result, the coil aperture may be increased while the necessary number of windings is ensured. Here, the first coil conductors are two-layered, and the second coil conductors are two-layered. The number of layers may be increased more, or the first coil conductors and the second coil conductors may be different in the number of layers.

Twelfth Preferred Embodiment

Figure 29:
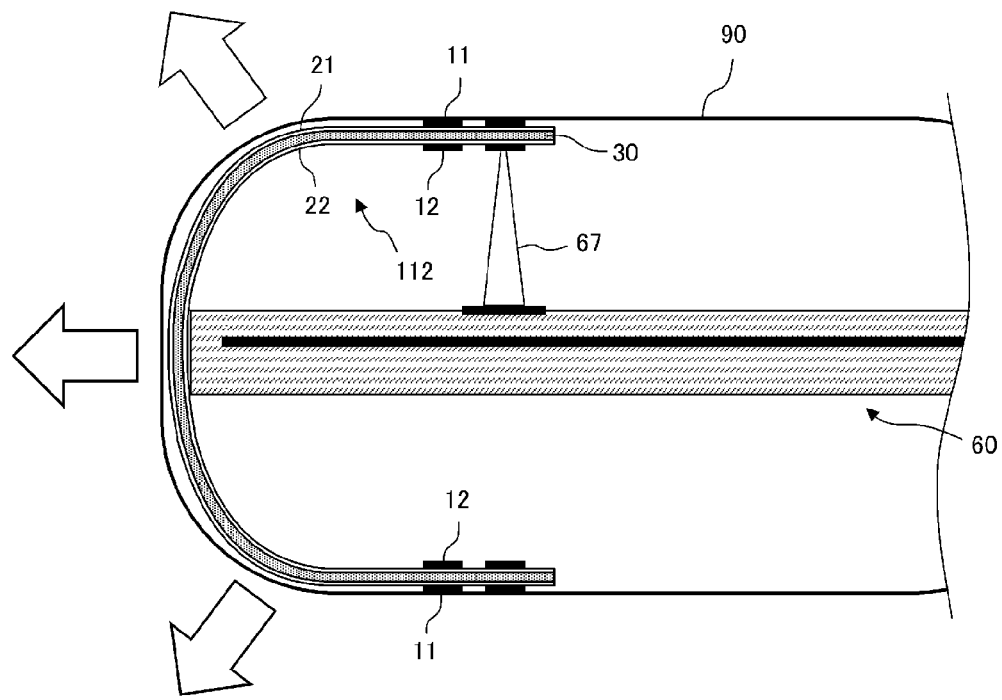
FIG. 29 is a sectional view of a major portion of a radio communication device according to a twelfth preferred embodiment of the present invention.

FIG. 29 is a sectional view of a major portion of a radio communication device according to a twelfth preferred embodiment of the present invention. In the example of FIG. 29, an antenna module 112 is disposed (for example, glued on) along a curved surface of a housing 90 of a radio communication device. The antenna module 112 is connected to a circuit on a board 60 via a pin terminal 67.

The basic structure of the antenna module 112 preferably is identical to the basic structure of the first preferred embodiment of the present invention. The first coil conductor 11 is provided on a flexible resin body 21 and the second coil conductor 12 is provided on a flexible resin body 22. Unlike the example of FIG. 21, the antenna module 112 is arranged across a plurality of surfaces of the housing. With this arrangement, directivity is widened as denoted by blank arrow marks as illustrated in FIG. 29.

If the antenna module 1112 is used as a booster antenna, a power supply coil may be mounted in place of the pin terminal 67. With such an arrangement, communications from non-mounting surface of the power supply coil are possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An antenna module comprising:
 a coil conductor wound in a coil configuration; wherein the coil conductor includes a first coil conductor and a second coil conductor;

the first coil conductor and the second coil conductor are arranged with a magnetic layer interposed therebetween so that a coil aperture of the first coil conductor and a coil aperture of the second coil conductor are opposed to each other in alignment;

the first coil conductor and the second coil conductor are connected to each other so that directions of magnetic fluxes generated in coil-wound axis directions of the first coil conductor and the second conductor are mutually opposite to each other; and the first coil conductor and the second coil conductor are asymmetric to each other with respect to the magnetic layer.

2. The antenna module according to claim 1, wherein the first coil conductor and the second coil conductor are electrically connected in series.

3. The antenna module according to claim 2, further comprising a first electrode connected to one end of the first coil conductor and a second electrode connected to one end of the second coil conductor, wherein the first coil conductor and the second coil conductor are connected in series via a capacitance generated between the first electrode and the second electrode.

4. The antenna module according to claim 1, wherein the first coil conductor and the second coil conductor are electrically connected in parallel.

5. The antenna module according to claim 1, wherein each of the first coil conductor and the second coil conductor is a coil conductor provided on a plane.

6. The antenna module according to claim 1, further comprising a metal object that is arranged on one of the coil apertures of the second coil conductor opposite the first coil conductor.

7. The antenna module according to claim 1, further comprising a booster antenna that is magnetically coupled via a magnetic flux that flows through a gap between the first coil conductor and the second coil conductor.

8. The antenna module according to claim 1, further comprising a power supply coil that is magnetically coupled via a magnetic flux that flows through a gap between the first coil conductor and the second coil conductor.

9. The antenna module according to claim 1, wherein the magnetic layer is a multi-layer board including a magnetic material layer, and the first coil conductor and the second coil conductor are provided in the magnetic material layer or a non-magnetic material layer of the multi-layer board.

10. A communication device comprising:
a communication circuit; and
an antenna module connected to the communication circuit;
the antenna module includes a coil conductor wound in a coil configuration; wherein
the coil conductor includes a first coil conductor and a second coil conductor;

the first coil conductor and the second coil conductor are arranged with a magnetic layer interposed therebetween so that a coil aperture of the first coil conductor and a coil aperture of the second coil conductor are opposed to each other in alignment;

the first coil conductor and the second coil conductor are connected to each other so that directions of magnetic fluxes generated in coil-wound axis directions of the first coil conductor and the second conductor are mutually opposite to each other; and the first coil conductor and the second coil conductor are asymmetric to each other with respect to the magnetic layer.

11. The communication device according to claim 10, wherein the first coil conductor and the second coil conductor are electrically connected in series.

12. The communication device according to claim 11, further comprising a first electrode connected to one end of the first coil conductor and a second electrode connected to one end of the second coil conductor, wherein the first coil conductor and the second coil conductor are connected in series via a capacitance generated between the first electrode and the second electrode.

13. The communication device according to claim 10, wherein the first coil conductor and the second coil conductor are electrically connected in parallel.

14. The communication device according to claim 10, wherein each of the first coil conductor and the second coil conductor is a coil conductor provided on a plane.

15. The communication device according to claim 10, further comprising a metal object that is arranged on one of the coil apertures of the second coil conductor opposite the first coil conductor.

16. The communication device according to claim 10, further comprising a booster antenna that is magnetically coupled via a magnetic flux that flows through a gap between the first coil conductor and the second coil conductor.

17. The communication device according to claim 10, further comprising a power supply coil that is magnetically coupled via a magnetic flux that flows through a gap between the first coil conductor and the second coil conductor.

18. The communication device according to claim 10, wherein the magnetic layer is a multi-layer board including a magnetic material layer, and the first coil conductor and the second coil conductor are provided in the magnetic material layer or a non-magnetic material layer of the multi-layer board.

* * * * *